Jan. 1, 1946.    R. S. GAUTHIER    2,392,285
METAL CUTTING TOOL
Filed March 12, 1943
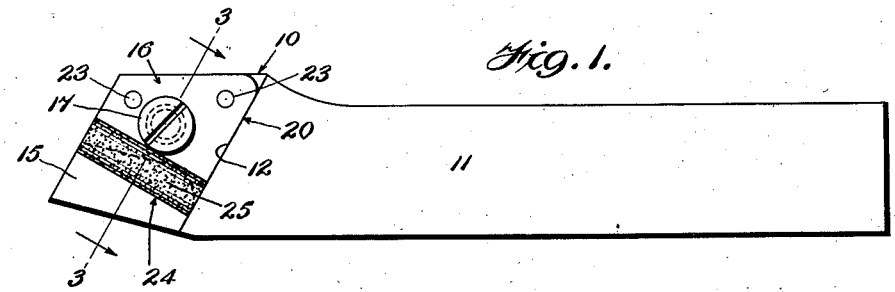
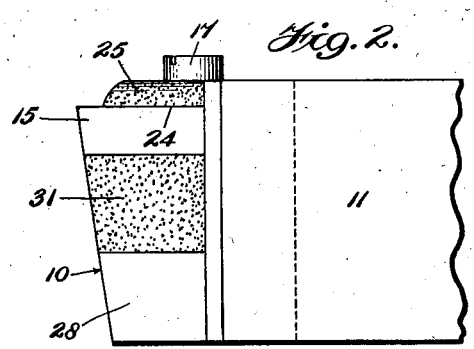 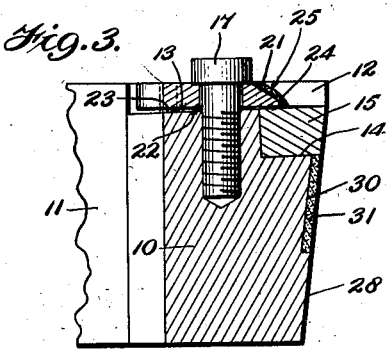
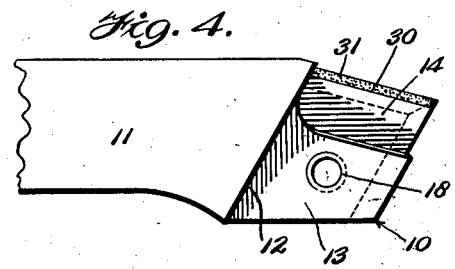 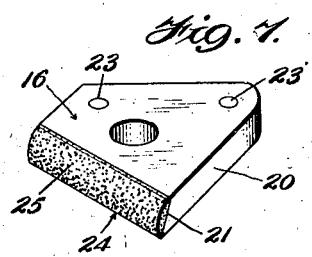
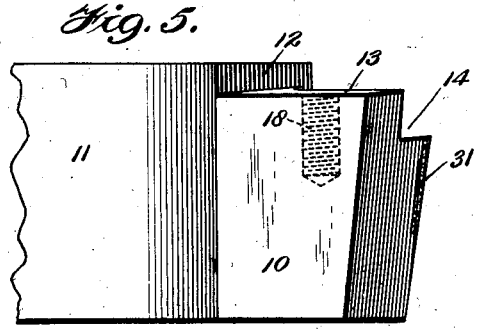
Inventor
*Robert S. Gauthier;*
By
*P. B. Collings.*
Attorney Patented Jan. 1, 1946

2,392,285

UNITED STATES PATENT OFFICE 2,392,285

METAL-CUTTING TOOL

Robert S. Gauthier, Milwaukee, Wis., assignor to Chain Belt Company, Milwaukee, Wis., a corporation of Wisconsin Application March 12, 1943, Serial No. 478,991

6 Claims. (Cl. 29—96)

The invention relates to metal-cutting tools, more especially those of the type in which a steel shank or holder carries an extremely hard cutting "chip" of tungsten carbide or similar material, and has for its principal object the improvement of tools of this character, particularly in regard to simplicity in construction, reduction in cost of manufacture, and increase in length of life.

In some forms of these tools the carbide cutting element or "chip" has heretofore been permanently cemented or brazed to the steel holder; but such "chips" while extremely hard, are also relatively brittle as compared to the steel of the holder, and have a coefficient of expansion different therefrom, with the result that the heat generated in the course of their use frequently causes them to crack due to unequal expansion of the chip and holder. The rigid attachment of the brittle cutting element to the holder may also induce cracking of the element should it encounter undue resistance, as by an unusual projection on the work piece, in the course of making a rough cut. Furthermore, in sharpening this type of tool it is necessary to grind the faces of both the chip and the holder, thus ultimately concurrently destroying the usefulness of both.

To overcome these drawbacks to this kind of tool it has been heretofore proposed to removably secure the carbide cutting elements to the holders or shanks in various ways, whereby they may be sharpened without also grinding away the holder, and may be readily replaced by new ones when they have been ground to a point where they are no longer usable, without the necessity of also replacing the holder. Difficulties have also been encountered in the use of such tools however, due at least in part to deterioration of the metal of the holder adjacent the chip under the rough usage to which the tools are commonly subjected, which deterioration lessens the effectiveness of the chip securing means whereupon the chip cracks, due to its extreme brittleness, and must be replaced.

The present invention has for a further object to overcome this defect in tools of the last mentioned type, and to provide such a tool wherein deterioration of at least the critical portions of the holder which would permit crack-inducing loosening and/or rocking of the chip in the holder is quite effectively guarded against.

For purposes of disclosure one form of the invention has been illustrated in the accompanying drawing forming a part of this specification, wherein Figure 1 is a plan view of a metal cutting tool constructed in accordance with the invention;

Fig. 2 is a fragmentary side elevational view of the parts shown in Fig. 1;

Fig. 3 is a transverse sectional view taken approximately on the plane indicated by the line 3—3 of Fig. 1, looking in the direction of the arrows;

Fig. 4 is a fragmentary plan view of the tool holder or shank;

Figs. 5 and 6 are side and end elevational views respectively of the said holder;

Fig. 7 is a perspective view of the chip clamping member; and

Fig. 8 is a similar view of the chip.

Referring more particularly to the said drawing, the top of the forward or chip carrying end portion 10 of the tool holder 11 is rabbeted to provide a vertical angularly disposed shoulder 12 extending across the holder, and a surface 13 which is slightly inclined to the horizontal, as will be clear from Figs. 3, 5 and 6. This rabbeted forward portion 10 of the holder is further provided along one longitudinal edge thereof with a recess or pocket 14 for receiving the cutting element or chip 15, which as above indicated may be of tungsten carbide or similar material. As will be clear from Figs. 1, 4 and 8, the recess 14 has substantially the same conformation as the chip so that the latter is adequately backed and supported by the walls of the recess.

For removably securing the chip in the said recess a clamping plate or member 16 is provided, of substantially trapezoidal form as shown in Figs. 1 and 7, which is secured in place in the rabbet by a screw or bolt 17 engaging in the threaded hole 18 provided in the end portion 10 of the holder. An end face 20 of the clamping member 16 abuts the shoulder 12 of the shank or holder 11 and prevents the clamp from turning, while a side face 21 of said clamp is beveled, as shown in Figs. 3 and 7. The under face 22 of the clamp is provided with a pair of projections, here illustrated as being constituted by the protruding ends of a pair of pins 23 threaded or press-fitted into the clamp member. These pins are so located that their said protruding ends engage the slightly inclined bottom surface 13 of the rabbet along its lower edge, thereby maintaining the clamping member 16 substantially horizontal as shown in Fig. 3, with only the edge portion 24, defined by the meeting of the under face 22 and the inclined face 21, engaging the upper face of the chip 15 to clamp it in the recess 14. As best shown in Fig. 1, this line of engagement is more or less along a longitudinal diagonal of the upper surface of the chip.

This contacting edge portion 24 and the beveled face 21 are the portions of the clamping member which are most subject to the above mentioned deterioration under the usual conditions of use of these tools, due largely to the fact that such portions are traversed by the hot metal turnings or chips from the work piece. To protect said portions against this and thereby materially reduce the likelihood of cracking the carbide cutting element 15, a layer of a hard surface weld material—such for example as the alloy known under the name "Colomonoy"—is welded over the said face 21, as indicated at 25.

The lateral face 28 of the portion 10 of the holder is also subject to deterioration which will result in loosening and/or rocking of the cutting element 15 in its recess 14, with consequent frequent cracking of the chip, especially when making roughing cuts. To overcome this, the said face 28 is provided with a recess 30, extending some distance downwardly from the chip recess 14, and a layer 31 of "Colomonoy" or like hard surface weld material is deposited in said recess 30 with an acetylene torch. This affords protection for the critical portion of the face 28 and provides continued adequate support for the lower forward edge of the cutting element 15 which, together with the protection afforded the critical portions of the clamp member 16, enables the tool to withstand long continued use and abuse in rough turning without loosening, rocking and cracking.

The pins or projections 23, which serve to keep the steel clamping plate out of contact with the holder and chip except along the edge 24, provide a slight yield or resilience in the clamp which also contributes to the prevention of damage to the chip.

While one specific example of tool constructed in accordance with the invention has been illustrated and described for purposes of disclosure, it will be obvious that those skilled in the art may vary the details of construction as well as the precise arrangement of parts without departing from the spirit of the invention, and therefore it is not wished to be limited to the above disclosure except as may be required by the claims.

What is claimed is:

1. In a metal cutting tool comprising a metal shank or holder having a recess, a hard brittle cutting element positioned in said recess, and means for readily removably clamping said element therein: means for reducing cracking of the brittle cutting element resulting from decrease in the effectiveness of the clamping action due to deterioration of portions of the metal of said shank and clamping means adjacent said element, comprising a hard surface metal deposit permanently attached to said metal portions of the clamping means and the shank in position to engage the upper and lower surfaces respectively of the cutting element.

2. In a metal cutting tool comprising a metal shank or holder having a recess, a hard brittle cutting element positioned in said recess, and means for readily removably clamping said element therein: means for reducing cracking of the brittle cutting element resulting from reduction in the effectiveness of the clamping action due to deterioration of portions of the metal of the holder along an outer edge of its recess, comprising a deposit of hard surface metal welded to said holder portions which are subject to deterioration, in position to be engaged by and to support the under portion of the cutting element.

3. In a metal cutting tool comprising a metal shank or holder having a recess, and a hard brittle cutting element positioned in said recess: means for readily removably clamping said element therein, comprising a metal clamping plate having an edge portion engageable with a surface of the element in a substantially line contact; and means for reducing cracking of the brittle cutting element resulting from reduction in the effectiveness of the clamping action of said plate due to deterioration of its metal in said edge portion, comprising a layer of hard surface weld metal permanently attached to said edge portion.

4. In a metal cutting tool comprising a metal shank or holder having a recess, and a hard brittle cutting element positioned in said recess: means for readily removably clamping said element therein, comprising a slightly resilient metal clamping plate having a beveled edge portion engageable with a surface of the element in a substantially line contact, and means for adjustably attaching the plate to said holder; and means for reducing cracking of the brittle cutting element resulting from reduction in the effectiveness of the clamping action of said plate due to deterioration of its metal in said beveled edge portion, comprising a deposit of hard surface metal welded to and covering said beveled edge.

5. A metal cutting tool, comprising a metal shank or holder having a recess for a cutting element opening to a lateral face thereof, and a second recess in said face extending from the first recess; a hard brittle cutting element disposed in said first recess; a metal clamping plate having an edge portion engageable with a surface of the cutting element to retain it in its recess, said plate having means for so positioning it that said engagement of its edge portion with the element is substantially a line contact; means for securing the plate to the holder; and means for reducing cracking of the brittle cutting element resulting from reduction in the effectiveness of the clamping action of said plate, comprising a deposit of a hard surface metal welded to said edge portion of the plate, and a similar deposit welded in said second recess of the holder in position to be engaged by and to support an edge portion of the cutting element.

6. A metal cutting tool, comprising a metal holder having a rabbet providing a transverse shoulder, a recess at one end of said rabbet for a cutting element, and a second recess in the side face of the holder at said end of the rabbet, opening to said first recess; a hard brittle cutting element disposed in said first recess; a slightly resilient metal clamping plate for removably securing the element in its recess, positioned in the rabbet with an edge portion engaging said shoulder to prevent turning of the plate, said plate also having a beveled edge portion engageable with a surface of the cutting element in a substantially line contact; means for removably securing said plate to the holder; and deposits of a hard surface weld metal welded to the beveled edge portion of the clamping plate and in said second recess of the holder, to reduce cracking of the brittle cutting element.

ROBERT S. GAUTHIER.